(No Model.)
C. W. LANE.
BAR AND PIPE CUTTER.
No. 280,487. Patented July 3, 1883.
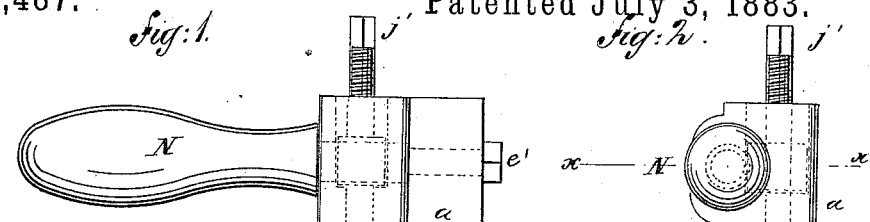
WITNESSES:
Chas. Nida
C. Sedgwick
INVENTOR:
C. W. Lane
BY Munn & Co.
ATTORNEYS.

UNITED STATES PATENT OFFICE.

CHARLES W. LANE, OF MINNEAPOLIS, MINNESOTA.

BAR AND PIPE CUTTER.

SPECIFICATION forming part of Letters Patent No. 280,487, dated July 3, 1883.

Application filed January 23, 1883. (No model.)

*To all whom it may concern:*

Be it known that I, CHARLES W. LANE, of Minneapolis, in the county of Hennepin and State of Minnesota, have invented a new and useful Improvement in Bar and Pipe Cutters, of which the following is a full, clear, and exact description.

My invention relates to that class of implements used for cutting iron bars or pipes that are adapted to be attached to the bar or pipe to be cut by suitable jaws, forming part of the implement, and turned around, like a crank, by hand upon the bar or pipe, to cause the cutting-tool of the implement to cut the bar or pipe circumferentially.

Reference is to be had to the accompanying drawings, forming part of this specification, in which similar letters of reference indicate corresponding parts in all the figures.

Figure 1 is a front elevation of my new and improved bar and pipe cutter as it appears when attached to a bar of iron for cutting the same. Fig. 2 is a side elevation of the same. Fig. 3 is a transverse sectional elevation taken on the line $x\ x$ of Fig. 2, and Fig. 4 is a transverse sectional elevation taken on the line $y\ y$ of Fig. 2.

A is the main iron bar or stock of the implement. At its upper end this bar or stock is cast with the enlargement $a$, and near its lower end, at the back, with the lug $b$, and at its extreme lower end with the foot E, which is slightly concaved upon its face, as shown in Figs. 2 and 4, and forms the main upper or stationary jaw of the implement; and this bar or stock A is also formed at its lower end with the side projection, $d$, which, together with the right-angled clamp-plate B, forms a socket for the cutting-tool C.

E' is the lower movable jaw of the implement, which jaw is formed with the square shank $e$, which enters a corresponding socket formed by the groove $f$ in the back of the bar or stock A, and the grooved clamp-plate F, secured to the back of said stock by suitable screws, as shown; and this jaw E' is adapted to be moved to and from the stationary jaw E for grasping the pipe or bar $g$ between them, as shown in Figs. 1 and 2, by means of the screw-rod G, which passes down through a screw-tap made in the jaw, and is journaled at its upper end in the lug $b$ in such manner that the head $h$ of the screw-rod runs upon the shoulder $f'$, formed on the back of the clamp-plate F, as clearly shown in Fig. 2. The head $h$ has the holes $i\ i$ made through it, in which a rod may be placed, to serve as a lever for turning the screw-rod G.

Upon the upper end of the cutting-tool C impinges the inner end of the feed-rod H, and said inner end of the rod is slightly reduced in size and runs in a small recess made in the upper end of the tool, as shown clearly in Figs. 1 and 2. The screw-threaded portion $j$ of the feed-rod H passes up through the internally-screw-threaded worm-nut J, held in the recess $k$, made in the enlarged portion $a$ of the main bar or stock A, and its outer extremity is made square, as shown at $j'$, for the application thereto of a wrench for rapidly screwing the rod in at the beginning of the work, to set the cutting-tool against the rod or pipe to be cut, or for rapidly unscrewing the rod for withdrawing the cutting-tool from the rod or pipe after it has been cut. This longitudinal movement is given to the feed-rod when turned with a wrench by the internal screw-threads of the said worm-nut J, which nut is held from any vertical or lateral movement by the walls of the recess $k$, formed in the said enlargement, and from turning with the feed-rod by the outer worm-teeth thereof engaging with the worm-teeth of the worm $l$, formed on the spindle L of the handle N of the implement. The spindle L of the handle passes through the enlargement $a$ of the stock A at right angles to the feed-rod H, and the worm $l$ thereof constantly engages with the teeth of the worm-nut J. The handle N is made fast to the spindle, and the spindle turns easily in the enlargement $a$, so that the grasp of the hand of the user of the implement, in turning the implement around the bar or pipe being cut, will cause the spindle to turn, which movement will cause the worm $l$ to slowly turn the worm-nut J, and this nut will in turn cause the feed-rod H to be slowly moved downward, and the cutting-tool C thus fed gradually forward for cutting the bar or pipe. The spindle L is held in place in the enlargement $a$ of the implement by the nut $e'$, placed upon its outer end, as shown in Figs. 1 and 3.

Constructed in this manner it will be seen that the feed is entirely automatic, requires no attention, is constant and uniform during the use of the implement, and the implement as a whole is cheap, simple, and complete, and efficient for its purpose.

Having thus described my invention, what I claim as new, and desire to secure by Letters Patent, is—

In implements for cutting bars and pipes, the stock A, having lug $b$, projection $d$, groove $f$, and end jaw, E, in combination with the clamp-plate B, the grooved clamp-plate F, having shoulder $f'$, the movable jaw E', having shank $e$, and the screw-rod G, having head $h$, with holes $i$, as shown and described.

CHARLES WILLIAM LANE.

Witnesses:
 FREEMAN P. LANE,
 LESTER C. LANE.